United States Patent
Ek et al.

(10) Patent No.: US 10,538,392 B2
(45) Date of Patent: Jan. 21, 2020

(54) MAGNETIC TRANSMISSION FOR CONVEYOR

(71) Applicant: FlexLink AB, Goeteborg (SE)

(72) Inventors: Anders Ek, Kullavik (SE); Dick Andersson, Goeteborg (SE)

(73) Assignee: FlexLink AB, Goeteborg (SE)

( * ) Notice: Subject to any disclaimer, the term of this patent is extended or adjusted under 35 U.S.C. 154(b) by 0 days.

(21) Appl. No.: 16/315,042

(22) PCT Filed: Jul. 14, 2017

(86) PCT No.: PCT/SE2017/050785
§ 371 (c)(1),
(2) Date: Jan. 3, 2019

(87) PCT Pub. No.: WO2018/013048
PCT Pub. Date: Jan. 18, 2018

(65) Prior Publication Data
US 2019/0248591 A1    Aug. 15, 2019

(30) Foreign Application Priority Data

Jul. 14, 2016  (EA) ...................................... 1651056

(51) Int. Cl.
*B65G 23/06* (2006.01)
*B65G 23/08* (2006.01)
(Continued)

(52) U.S. Cl.
CPC ............. *B65G 23/06* (2013.01); *B65G 23/08* (2013.01); *B65G 23/24* (2013.01); *H02K 7/003* (2013.01); *H02K 7/14* (2013.01)

(58) Field of Classification Search
CPC ........ B65G 23/06; B65G 23/08; B65G 23/24; B65G 23/26; H02K 7/003; H02K 7/1016;
(Continued)

(56) References Cited

U.S. PATENT DOCUMENTS

| 6,710,505 | B1 | 3/2004 | Barani et al. |
| 8,690,418 | B2 * | 4/2014 | Ludwig ............... B01F 3/04269 366/102 |

(Continued)

FOREIGN PATENT DOCUMENTS

| GB | 2472020 A | 1/2011 |
| JP | S 60142214 U | 9/1985 |

(Continued)

OTHER PUBLICATIONS

International Searching Authority, International Search Report and Written Opinion for International Application No. PCT/SE2017/050785, dated Oct. 9, 2017, 11 pages, Swedish Patent Registration Office, Sweden.

*Primary Examiner* — Mark A Deuble
(74) *Attorney, Agent, or Firm* — Alston & Bird LLP (57) ABSTRACT

A drive unit for an endless conveyor, comprising a magnetic transmission and an electric motor connected to an input shaft of the magnetic transmission, where the magnetic transmission comprises a rotatable outer cylinder comprising a plurality of permanent magnets arranged as magnetic poles at the inner side of the outer cylinder, an intermediate cylindrical element comprising a plurality of ferromagnetic pole pieces, an inner cylinder comprising a plurality of permanent magnets arranged as magnetic poles at the outer side of the inner cylinder, where the outer side of the outer cylinder is configured with a drive surface adapted to interact with a conveyor belt or conveyor chain. The advantage of the invention is that a compact and efficient drive unit for a conveyor system is provided, which is provided with a contactless predefined slip.

12 Claims, 6 Drawing Sheets

(51) Int. Cl.
*H02K 7/14* (2006.01)
*H02K 7/00* (2006.01)
*B65G 23/24* (2006.01)

(58) Field of Classification Search
CPC .......... H02K 7/14; H02K 16/02; H02K 49/10; H02K 49/106
USPC .................................................... 198/781.01
See application file for complete search history.

(56) References Cited

U.S. PATENT DOCUMENTS

| | | | |
|---|---|---|---|
| 9,790,032 B2* | 10/2017 | Lautenschlager ...... | B65G 23/08 |
| 10,005,644 B2* | 6/2018 | Vincent ................... | B66B 11/04 |
| 10,089,013 B2* | 10/2018 | Smith ....................... | G06F 9/50 |
| 2003/0019724 A1* | 1/2003 | Ranger ................ | B65G 13/071 |
| | | | 198/502.1 |
| 2004/0108781 A1 | 6/2004 | Razzell et al. | |
| 2008/0236998 A1* | 10/2008 | Shurko ................ | B65G 13/071 |
| | | | 198/781.02 |
| 2012/0146442 A1 | 6/2012 | Atallah et al. | |
| 2014/0110227 A1* | 4/2014 | Ragan .................. | H02K 7/1008 |
| | | | 198/835 |
| 2014/0305773 A1* | 10/2014 | Agnoff ................... | B65G 23/26 |
| | | | 198/788 |
| 2016/0257495 A1* | 9/2016 | Reed .................... | B65G 13/073 |

FOREIGN PATENT DOCUMENTS

| | | |
|---|---|---|
| KR | 20100108641 A | 10/2010 |
| WO | WO 2003/008307 A1 | 1/2003 |
| WO | WO 2015/121647 A1 | 8/2015 |

* cited by examiner

MAGNETIC TRANSMISSION FOR CONVEYOR

CROSS REFERENCE TO RELATED APPLICATIONS

This application is a National Stage Application, filed under 35 U.S.C. § 371, of International Application No. PCT/SE2017/050785, filed Jul. 14, 2017, which claims priority to Swedish Application No. 1651056-2, filed Jul. 14, 2016; the contents of both of which are hereby incorporated by reference in their entirety.

BACKGROUND

Related Field

The present invention relates to a magnetic transmission for a conveyor drive unit used to drive a conveyor belt or a conveyor chain in a conveyor system.

Description of Related Art

Conveying devices, such as those which are used for moving objects between different stations in e.g. a factory or a production plant, usually comprise a conveying track in the form of a belt or a chain. The conveying tracks can be recessed in a trench with vertical side surfaces. Alternatively, they can be located on the horizontal upper surfaces of the trench or beam or may be arranged in some other way. The objects to be conveyed are arranged slidably in relation to the conveying tracks, either directly or via supporting means. Larger objects are often conveyed on supporting means also known as pallets, and smaller objects may be conveyed using a small carrier often referred to as a carrier puck.

The conveyor chain is forwarded by a drive unit comprising a motor. The conveyor chains runs in conveyor beams and glides on slide rails attached to the conveyor beams. Both the conveyor chain and the slide rails may be made from a low friction material in order to reduce power consumption, to reduce wear and to reduce noise caused by vibrations. In the forward direction, i.e. when the chain transports objects, the underside of the upper body bears on upper slide rails of the conveyor beam. In the return direction, i.e. when the chain travels upside down in the return path, the upper side of the conveyor chain may be supported by a bearing surface on which the conveyor chain glides. The conveyor chain may also be provided with tabs or protrusions by which the chain may bear on an inner slide rail of the conveyor beam.

The drive unit is often positioned at an end of the conveyor, where the chain changes direction from a forward direction to a return direction at the bottom of the conveyor beam. It is also possible to arrange drive units as intermediate drive units, placed along the conveyor. A horizontal bend drive unit is used where an endless chain does not have a return chain. Other types of drive units are also possible to use. Also conveyor belts are driven by a drive unit arranged at one end of the conveyor.

The most common drive unit is a drive unit positioned at one end of a conveyor. Such a drive unit comprises a motor, often a gear and a relatively large drive wheel which is provided with notches along the circumference of the drive wheel, when the drive wheel is to drive a conveyor chain. The notches are semi-circular and will engage with drive protrusions of the conveyor chain in order to drive the conveyor chain forwards. A conveyor belt having a toothed inner side will also use a drive wheel having grooves or teeth that will interact with the toothed inner side. A smooth conveyor belt will preferably be driven by a drive wheel having a smooth but rough surface in order to increase the friction between the drive wheel and the drive belt. The drive surface may also be treated with a friction increasing treatment, such as a coating of rubber or plastic.

The drive unit is normally a relatively large motor comprising a transmission and preferably a friction clutch in order to allow for slippage if e.g. a product is caught or the conveyor chain is stopped for some other reason. The motor, the transmission and the clutch are normally arranged at the side of the conveyor track. The transmission will convert the relatively high rotational speed of the electric engine to a relatively low rotational speed of the drive wheel. At the same time, the torque of the drive wheel is increased compared to the electric motor.

Other types of drive units for a conveyor chain are also known, with various solutions using drive belts with different engaging means to engage the conveyor chain.

GB 2472020 A discloses a drum motor comprising a radially mounted drive element comprising an electrical machine with integral magnetic gearing. The motor has an outer fixed stator housing provided with a wound stator with permanent magnets surrounding a high speed low torque permanent magnet rotor and a low speed, high torque rotor comprising magnetic pole pieces being arranged between the stator and the high speed rotor and being connected to an output drive shaft. The low speed rotor is connected to an input shaft. The outer stator housing is fixed.

WO 2015/121647 A discloses a system comprising a pole piece rotor, a permanent magnetic rotor and a fixed outer stator.

US 2012/0146442 A discloses an electrical machine having an inner rotor with permanent magnets, an outer rotor having a plurality of pole-pieces that enable the magnetic interaction between the pluralities of permanent magnets, and an outer stator that is fixed.

There is room for an improved drive unit for an endless conveyor chain comprising a plurality of chain links.

BRIEF SUMMARY

An object of the invention is therefore to provide an improved drive unit having a magnetic transmission. A further object is to provide an improved drive unit that is provided with a predefined slip. A further object of the invention is to provide a conveyor system comprising such a drive unit.

The solution to the problem according to the invention is described in the characterizing part of claim 1 for the drive unit and in claim 12 for the conveyor system. Further claims are directed to advantageous embodiments and further developments of the drive unit and conveyor system.

In a drive unit for an endless conveyor, comprising a magnetic transmission and an electric motor connected to an input shaft of the magnetic transmission, where the magnetic transmission comprises a rotatable outer cylinder comprising a plurality of permanent magnets arranged as magnetic poles at the inner side of the outer cylinder, an intermediate cylindrical element comprising a plurality of ferromagnetic pole pieces, an inner cylinder comprising a plurality of permanent magnets arranged as magnetic poles at the outer side of the inner cylinder, the object of the invention is achieved in that the outer side of the outer cylinder is configured with a drive surface adapted to interact with a conveyor belt or conveyor chain.

By this first embodiment of the drive unit according to the invention, the drive unit will provide a smooth and reliable drive of a conveyor belt or conveyor chain comprising a plurality of chain links. The drive unit can be made compact such that it fits inside the drive wheel or belt drum of the conveyor. The drive unit will further allow for a predefined slip of the transmission, which is obtained without any mechanical contact between the input and the output of the transmission. The efficiency of the drive unit is further higher than for a comparable drive unit using a planetary gear. Further, the drive unit allows for a higher gear ratio than for a comparable planetary gear. With a magnetic transmission, a gear ratio of up to 1:15 is possible, whereas a planetary gear will provide a gear ratio of up to 1:10.

The outer side of the outer cylinder of the magnetic transmission constitutes the drive surface of the drive unit. The drive surface may either be a flat surface that may be provided with a rough surface layer in order to provide a high friction for a smooth conveyor belt, or may be provided with a surface treatment comprising a high friction material such as rubber or plastic. The drive surface may also be provided with a plurality of transverse grooves that are adapted to interact with the teeth of a toothed conveyor belt. The grooves of the drive surface may also be adapted to engage drive protrusions of a conveyor chain. In this case, the drive surface will comprise two toothed wheels.

In an advantageous development of the invention, the intermediate cylindrical element will constitute the input shaft of the magnetic transmission and the inner cylinder will be stationary. An electric motor will in this case drive the intermediate cylindrical element, which will cause the outer cylinder to rotate at a lower speed but with a higher torque than the intermediate cylindrical element. In this configuration, the electric motor is preferably arranged adjacent of the magnetic transmission, and may be positioned side by side of the magnetic transmission inside the outer cylinder. This will give a compact and cost-effective solution. The electric motor can be directly connected to the input shaft. Since the magnetic transmission is provided with a contactless slip, there is no need to use a friction clutch between the motor and the transmission. At the same time, vibrations from the motor will not transfer to the outer cylinder, since there is no mechanical contact between the input shaft and the outer cylinder. The motor may also be mounted outside of the outer cylinder, e.g. at the side of the conveyor, in order to improve cooling of the motor or to enhance serviceability.

In an advantageous development of the invention, the inner cylinder will constitute the input shaft of the magnetic transmission and the intermediate element will be stationary. An electric motor will in this case drive the inner cylinder, which will cause the outer cylinder to rotate at a lower speed but with a higher torque than the inner cylinder. The electric motor may be arranged adjacent of the magnetic transmission, and may also be arranged side by side to the magnetic transmission inside the outer cylinder. This will give a compact and cost-effective solution. The electric motor can be directly connected to the input shaft. Since the magnetic transmission is provided with a contactless slip, there is no need to use a friction clutch between the motor and the transmission. At the same time, vibrations from the motor will not transfer to the outer cylinder, since there is no mechanical contact between the input shaft and the outer cylinder. The motor may also be mounted outside of the outer cylinder, e.g. at the side of the conveyor, in order to improve cooling of the motor or to enhance serviceability.

It is also possible to integrate the motor with the inner cylinder by arranging a stator inside the inner cylinder. The stator comprises electrical windings and is stationary. The inner side of the inner cylinder will constitute the rotor of the motor, and will in this case be provided with a plurality of permanent magnets that will provide the motor poles. With this solution, a very compact solution is possible to obtain. The stator, the inner cylinder, the intermediate cylindrical element and the outer cylinder are all arranged at the same rotational axis of the drive unit, preferably with roller bearings.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims.

Figure 1:
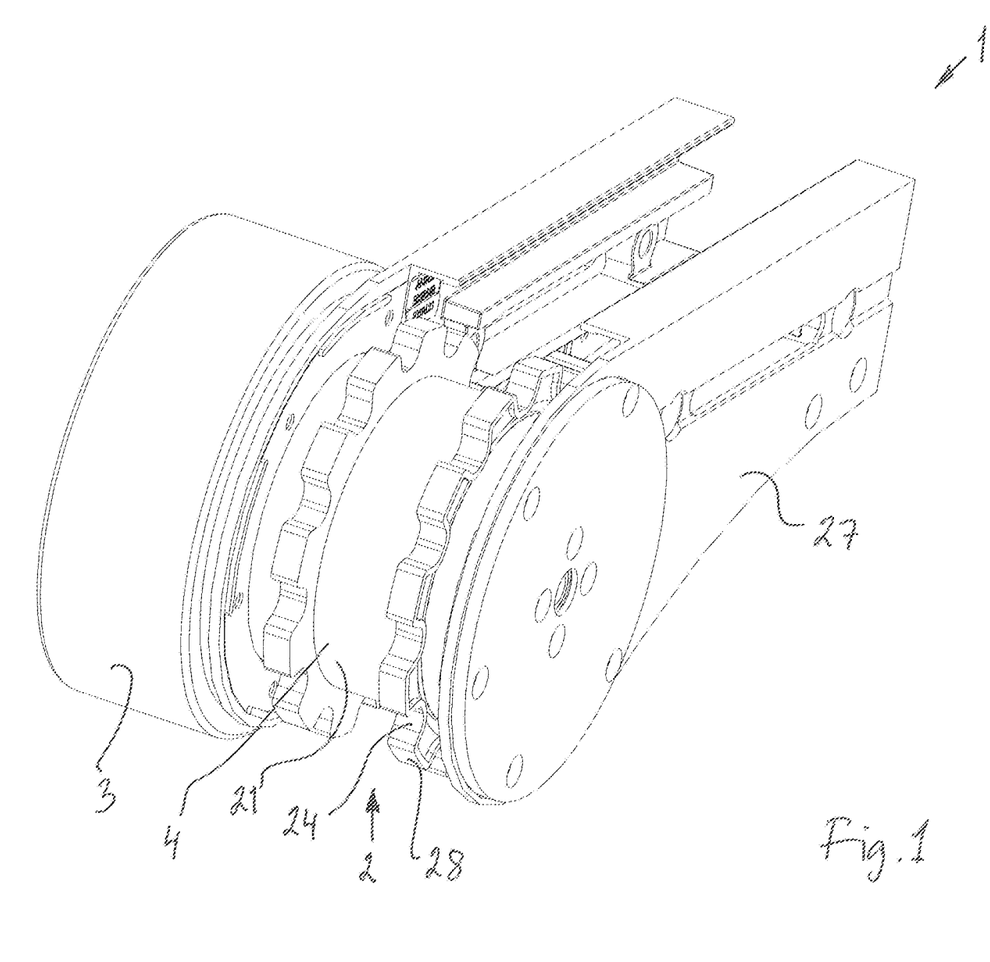
FIG. 1 shows a drive unit according to the invention.
Figure 2:
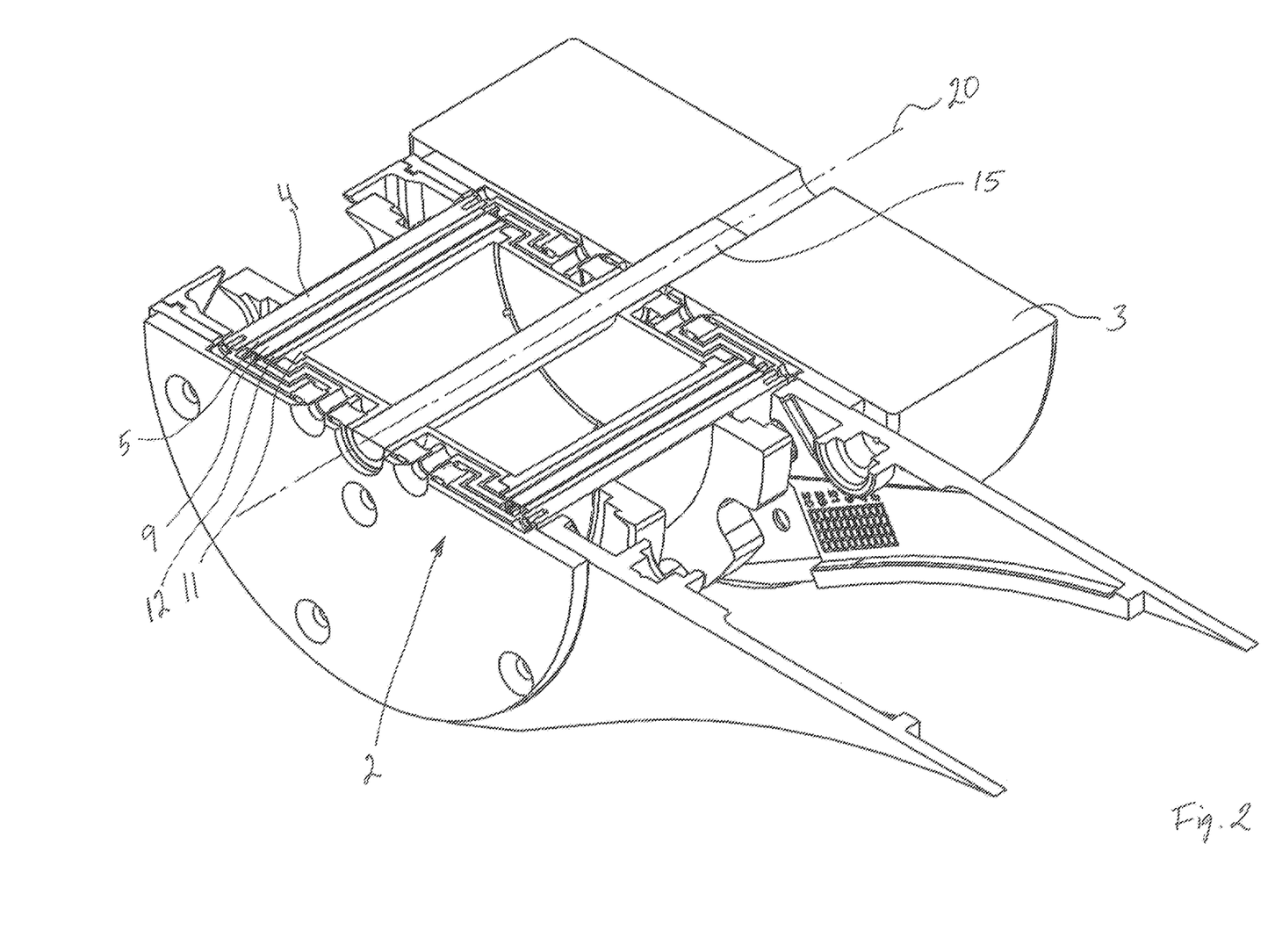
FIG. 2 shows a horizontal cut through a drive unit according to the invention.
Figure 3:
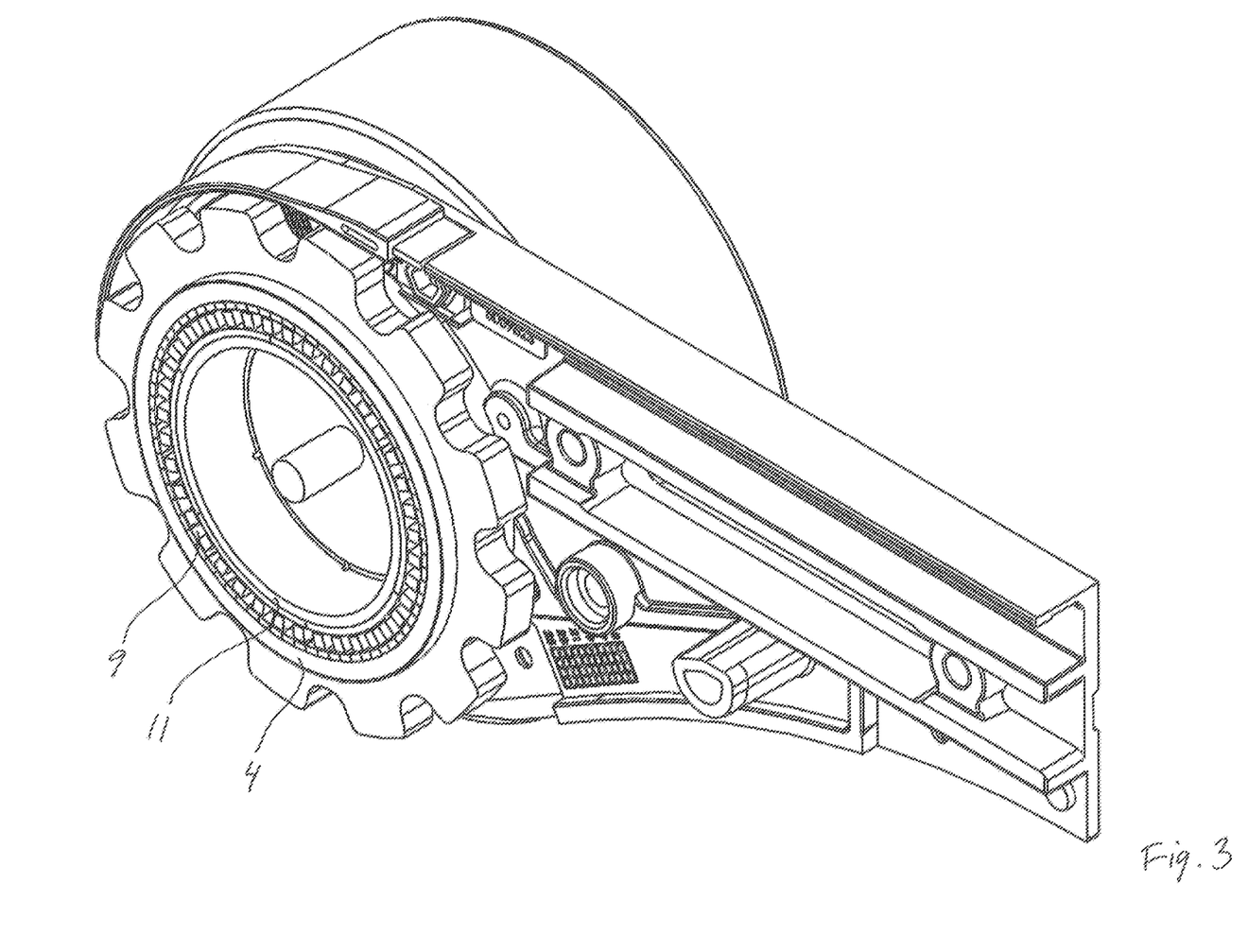
FIG. 3 shows a vertical cut through a drive unit according to the invention.
Figure 4:
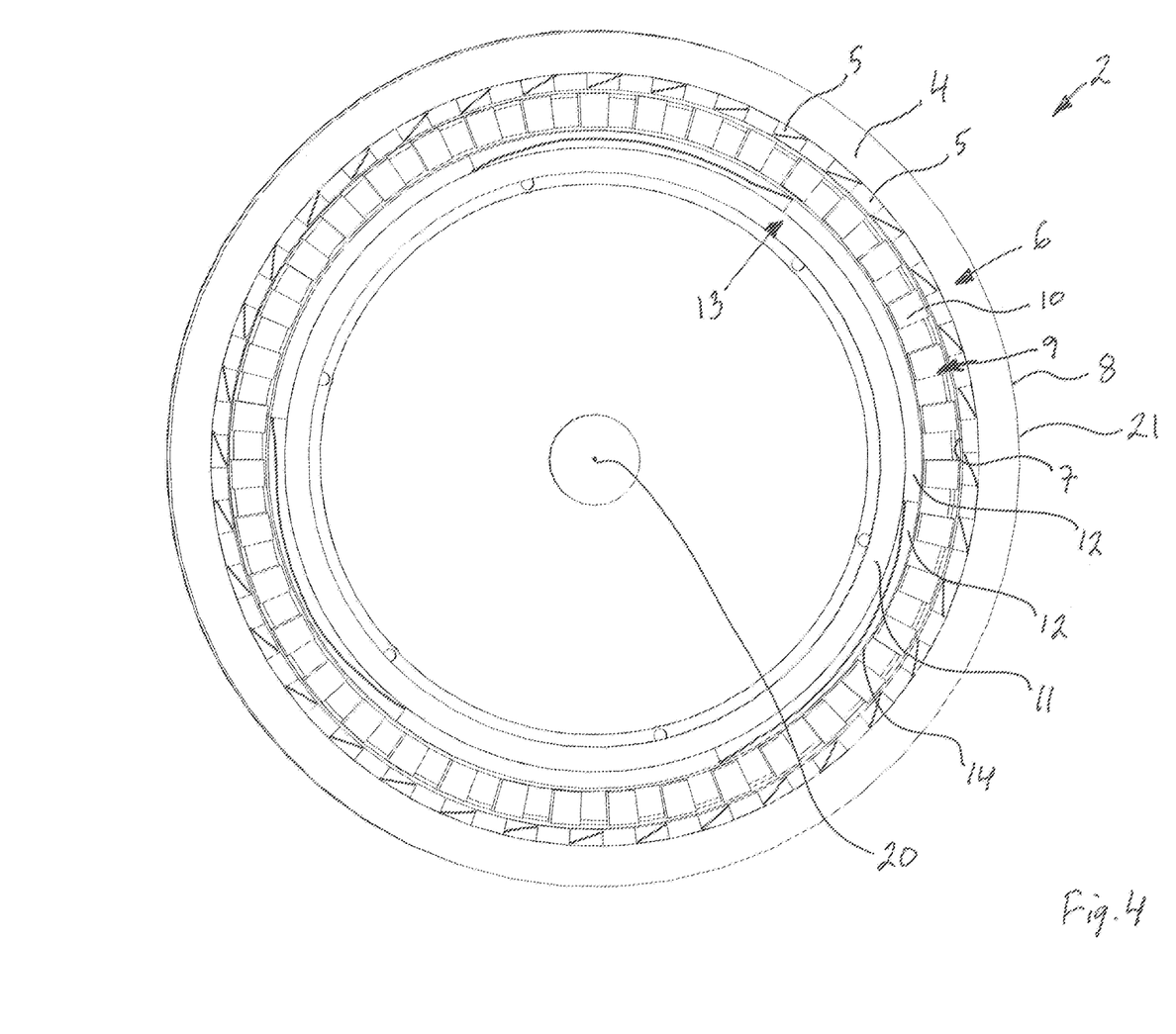
FIG. 4 shows a detail of a magnetic transmission of a drive unit according to the invention.

FIG. 1 shows an example of an inventive drive unit 1, FIG. 2 shows a horizontal cut through the drive unit, FIG. 3 shows a vertical cut through the drive unit and FIG. 4 shows a detail of a magnetic transmission. The drive unit of this example is arranged to drive a conveyor chain comprising a plurality of conveyor chain links. In the following description, a conveyor chain will be used as an example of a conveyor driven by the drive unit. It is however emphasised that the invention is suitable for all types of conveyors comprising conveyor belts or conveyor chains.

Such a conveyor chain (not shown) is adapted to travel on a conveyor beam 27 provided with slide rails. One or more conveyor chains with conveyor beams make up a conveyor system, which may also comprise other functional elements, such as diverters, stops, drive units, handling stations etc. The conveyor system is used for moving objects between different stations in e.g. a factory. The objects are conveyed by the conveyor chain, either directly or via supporting means, which are also known as pucks or pallets. Such conveyor systems are well known in the art.

The conveyor chain is driven by a drive unit 1 arranged at one end of the conveyor. At the other end, an idler wheel is used to link the conveyor chain to the return path. The chain links of the conveyor chain are arranged to hold the conveyor chain in a conveyor beam and to provide engagement means in the form of drive protrusions arranged to cooperate with a drive wheel 28 comprised in the drive unit 1. A chain link is provided with two drive protrusions arranged on each side of the chain link. The protrusions constitute the engagement means and also a sliding surface that helps to hold the conveyor chain in the conveyor beam. When the conveyor chain travels in the forward direction on top of the conveyor beam, the protrusion holds the chain in the conveyor beam in curves etc. When the conveyor chain travels in the return path in the lower part of the conveyor beam, the protrusion provides the support surface on which the conveyor chain glides.

The drive unit 1 comprises a magnetic transmission 2 and an electrical motor 3 adapted to drive the conveyor chain by the magnetic transmission. The magnetic transmission comprises a rotatable outer cylinder 4 comprising a plurality of permanent magnets 5 arranged as magnetic poles 6 at the inner side 7 of the outer cylinder. The number of magnetic poles of the outer cylinder is relatively large, and may be in the region between 20 to 40 or more. The outer cylinder is at the same time the drive wheel of the drive unit, where the outer surface constitutes a drive surface 21 adapted to interact with the conveyor chain.

The magnetic transmission further comprises an intermediate cylindrical element 9 comprising a plurality of ferromagnetic pole pieces 10. The pole pieces are made of segments of ferromagnetic material, comprising either two different segments have different magnetic properties or one type of segment separated by air voids. The number of pole pieces is relatively large, corresponding to the number of magnetic poles of the outer cylinder, but not being equal in number. The number of pole pieces may be somewhat larger than the number of magnetic poles of the outer cylinder.

The magnetic transmission also comprises a rotatable inner cylinder 11 comprising a plurality of permanent magnets 12 arranged as magnetic poles 13 at the outer side 14 of the inner cylinder 11. The number of magnetic poles of the inner cylinder is relatively small, and may e.g. comprise 3 or 4 magnetic poles. A magnetic pole comprises a north pole magnet and a south pole magnet. The relationship between the number of magnetic poles of the outer cylinder, the number of pole pieces and the number of magnetic poles of the inner cylinder will determine the gear ratio of the magnetic transmission.

In the shown example, the inner cylinder 11 is the input of the magnetic transmission and the intermediate element is arranged in a stationary way, fixed to the conveyor beam. The electric motor is here connected directly to the inner cylinder by the input shaft 15, and will rotate the inner cylinder which will cause the outer cylinder to rotate at a lower speed but with a higher torque than the inner cylinder. The electric motor is arranged adjacent the magnetic transmission, on the side of the conveyor beam and the magnetic transmission, as shown in FIG. 1. This provides a compact and cost-effective solution, where the motor receives adequate cooling. A further advantage of mounting the motor on the side of the magnetic transmission is that different motors having different power ratings can be used with the same magnetic transmission. The electric motor can be directly connected to the input shaft. Since the magnetic transmission is provided with a contactless slip, there is no need to use a friction clutch between the motor and the transmission. At the same time, vibrations from the motor will not transfer to the outer cylinder, since there is no mechanical contact between the input shaft and the outer cylinder. Depending on the size of the outer cylinder, the motor may also be mounted inside of the outer cylinder. This may be advantageous when e.g. a wide conveyor belt is to be driven, where there are enough place inside the belt drum.

In another example, the intermediate cylindrical element 9 will constitute the input shaft of the magnetic transmission and the inner cylinder will be arranged in a stationary way. The electric motor will in this case be connected directly to the intermediate cylindrical element, and will rotate the intermediate cylindrical element which will cause the outer cylinder to rotate at a lower speed but with a higher torque than the intermediate cylindrical element. In this example, the electric motor is preferably arranged adjacent of the magnetic transmission, either inside or outside of the outer cylinder. This will give a compact and cost-effective solution. The electric motor can be directly connected to the input shaft. Since the magnetic transmission is provided with a contactless slip, there is no need to use a friction clutch between the motor and the transmission. At the same time, vibrations from the motor will not transfer to the outer cylinder, since there is no mechanical contact between the input shaft and the outer cylinder. The motor may also be mounted outside of the outer cylinder, e.g. at the side of the conveyor, in order to improve cooling of the motor or to enhance serviceability.

Figure 5:
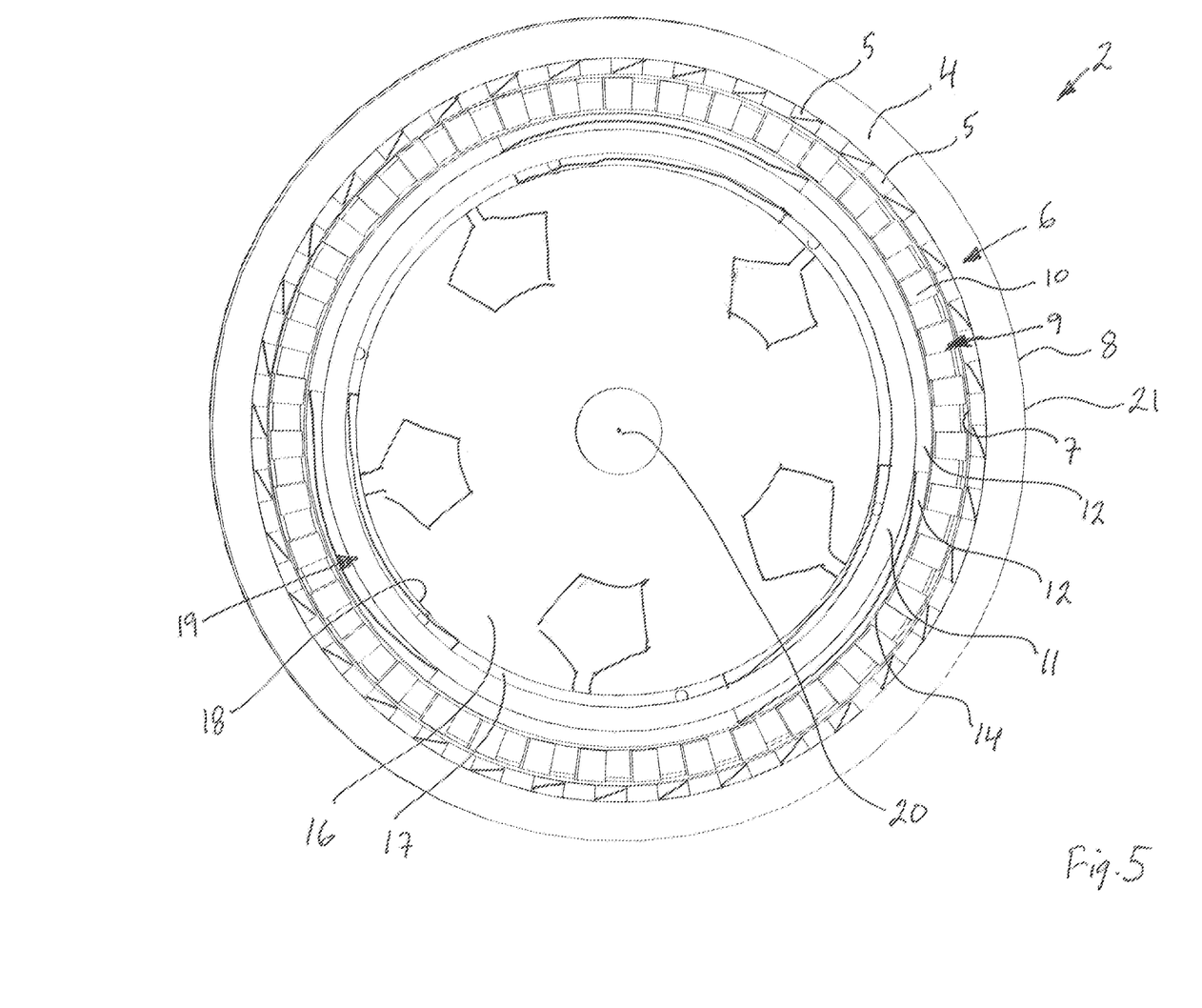
FIG. 5 shows another example of a drive unit according to the invention.

FIG. 5 shows a further example of the inventive drive unit. Here, the motor is integrated with the inner cylinder 11 which will function both as the input shaft and as part of the motor. A stator 16 comprising electrical windings is arranged inside the inner cylinder. The stator is arranged in a stationary way. The inner side 18 of the inner cylinder 11 will constitute the rotor 19 of the motor, and will in this case be provided with a plurality of permanent magnets 17 that will provide the motor poles. With this solution, a very compact solution is possible to obtain. The stator, the inner cylinder, the intermediate cylindrical element and the outer cylinder are all arranged at the same rotational axis 20 of the drive unit, preferably with roller bearings.

Figure 6:
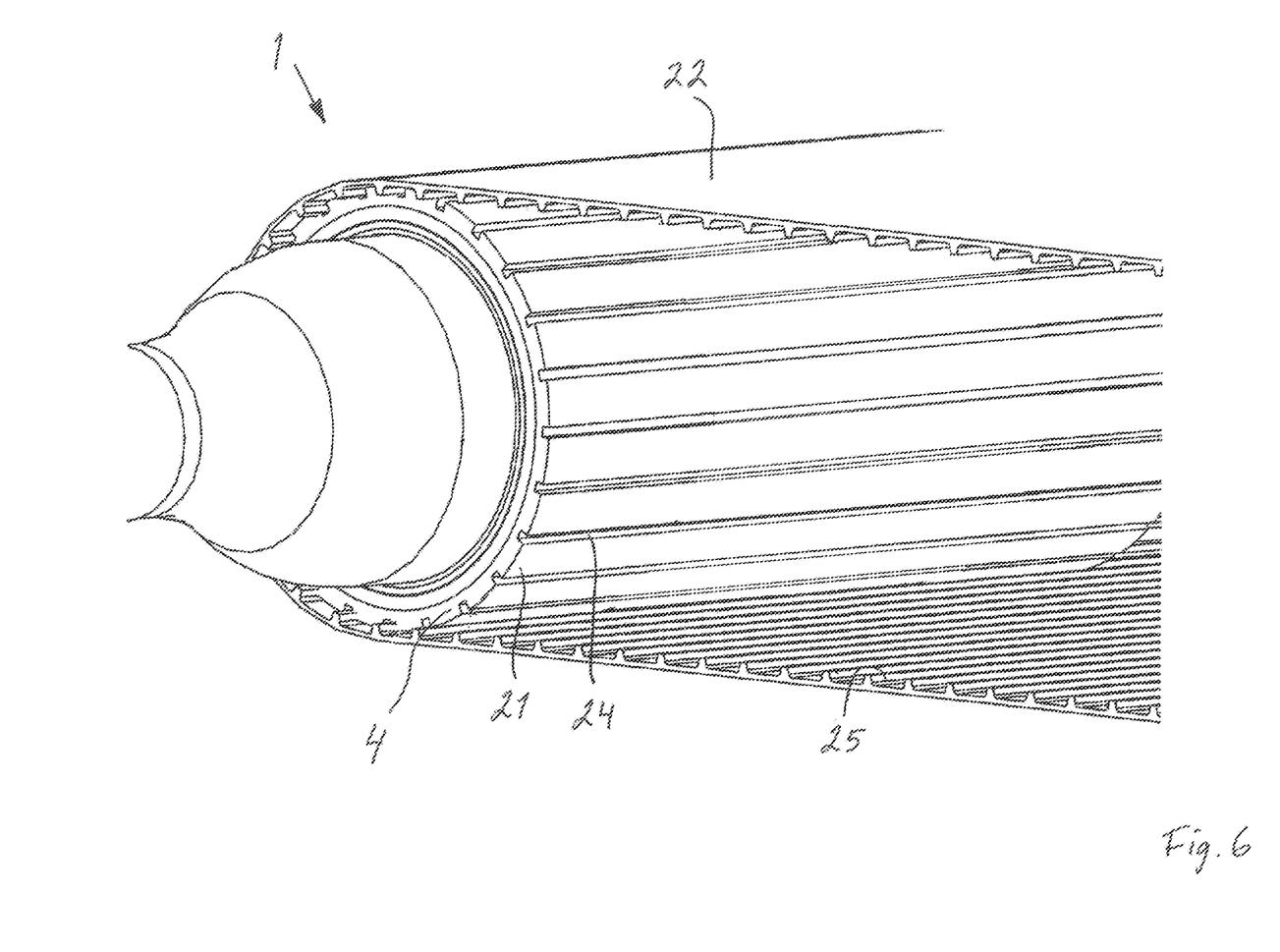
FIG. 6 shows an example of a drive surface adapted for a conveyor belt according to the invention.

FIG. 6 shows an example of the outer cylinder provided with grooves 24 adapted to interact and drive a conveyor belt 22 comprising a plurality of teeth 25. This allows for a compact and reliable drive unit for a conveyor system. If the magnetic transmission is subjected to a too high torque, e.g. if a conveyed object is caught between the conveyor chain and an external structure such that the conveyor chain is stopped, the magnetic transmission will slip. Since there is no mechanical connection between the input and the output of the magnetic transmission, the outer and inner cylinders will slip relative each other when the magnetic fields of the magnetic poles are subjected to an excessive load. The slip is determined e.g. by the types and sizes of magnets used.

The inventive drive unit will provide a smooth and reliable drive of a conveyor belt or conveyor chain. The drive unit can be made compact such that it fits inside the drive wheel of the conveyor. The efficiency of the drive unit is further higher than for a comparable drive unit using a planetary gear. Further, the drive unit allows for a higher gear ratio than for a comparable planetary gear. With a magnetic transmission, a gear ratio of up to 1:15 is possible, whereas a planetary gear will provide a gear ratio of up to 1:10.

The invention is not to be regarded as being limited to the embodiments described above, a number of additional variants and modifications being possible within the scope of the subsequent patent claims.

REFERENCE SIGNS

1: Drive unit
2: Magnetic transmission
3: Electric motor
4: Outer cylinder
5: Permanent magnets
6: Pole
7: Inner side
8: Outer side
9: Cylindrical element
10: Ferromagnetic pole pieces 11: Inner cylinder
12: Permanent magnets
13: Poles
14: Outer side
15: Input shaft
16: Stator
17: Permanent magnets
18: Inner side
19: Rotor
20: Rotational axis
21: Drive surface
22: Conveyor belt
23: Conveyor chain
24: Groove
25: Tooth
26: Drive protrusion
27: Conveyor beam
28: Drive wheel

The invention claimed is:

1. Drive unit (1) for an endless conveyor, the drive unit (1) comprising:
 a magnetic transmission (2) comprising an input shaft (15); and
 an electric motor (3) connected to the input shaft (15), wherein the magnetic transmission (2) further comprises:
  a rotatable outer cylinder (4) comprising a plurality of permanent magnets (5) arranged as magnetic poles (6) at the inner side (7) of the outer cylinder (4),
  an intermediate cylindrical element (9) comprising a plurality of ferromagnetic pole pieces (10),
  an inner cylinder (11) comprising a plurality of permanent magnets (12) arranged as magnetic poles (13) at the outer side (14) of the inner cylinder (11), and
  the outer side (8) of the outer cylinder (4) is configured with a drive surface (21) adapted to interact with a conveyor belt or conveyor chain.

2. Drive unit according to claim 1, wherein the drive surface (21) is provided with a rough surface configured to drive a smooth conveyor belt (22).

3. Drive unit according to claim 1, wherein the drive surface (21) is provided with a plurality of grooves (24) configured to interact with corresponding teeth (25) of a conveyor belt or conveyor chain.

4. Drive unit according to claim 1, wherein the drive surface (21) is provided with a plurality of grooves (24) configured to interact with drive protrusions (26) of a conveyor chain.

5. Drive unit according to claim 1, wherein the intermediate cylindrical element (9) constitutes the input shaft (15) of the magnetic transmission (2) and the inner cylinder (11) is stationary.

6. Drive unit according to claim 1, wherein the inner cylinder (11) constitutes the input shaft (15) of the magnetic transmission (2) and the intermediate cylindrical element (9) is stationary.

7. Drive unit according to claim 1, wherein the electric motor (3) is positioned adjacent the magnetic transmission (2).

8. Drive unit according to claim 1, wherein the electric motor (3) is positioned inside the outer cylinder (4).

9. Drive unit according to claim 6, wherein a stator (16) is positioned inside the inner cylinder (11).

10. Drive unit according to claim 9, wherein a rotor (19) is positioned inside the inner cylinder (11).

11. Drive unit according to claim 9, wherein:
 the stator (16) and the inner cylinder (11) constitute the electric motor (3),
 the stator (16) is stationary, and
 a plurality of permanent magnets (17) are arranged at the inner side (18) of the inner cylinder (11).

12. Conveyor system comprising a drive unit according to claim 1.

* * * * *